Figure 12:
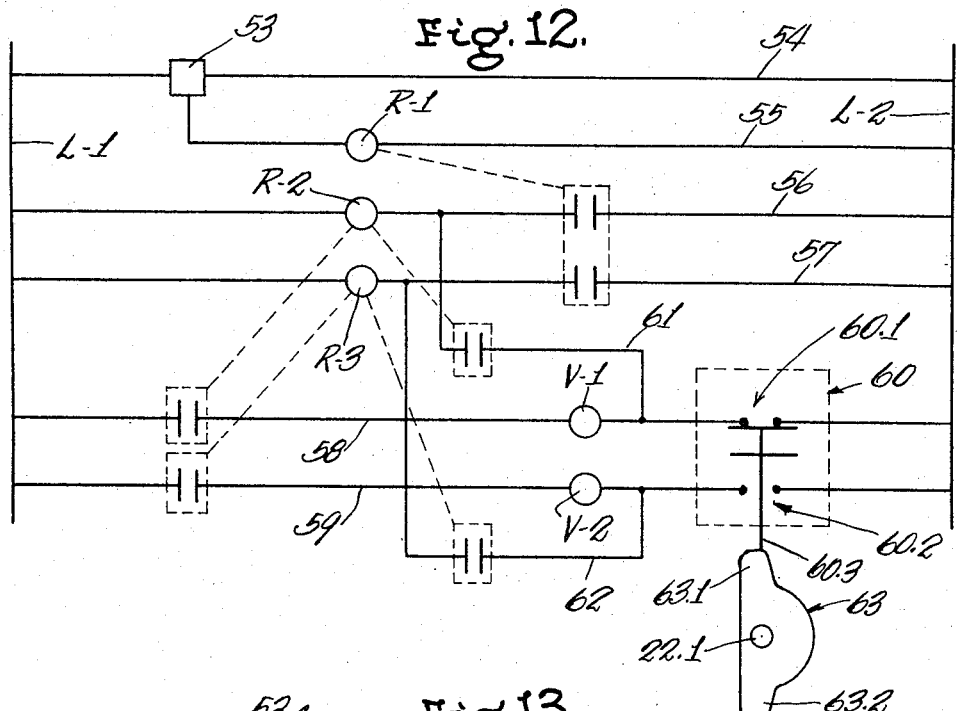

Sept. 19, 1967     H. C. LEDEBUR     3,342,302
METHODS OF AND APPARATUS FOR HANDLING
ELONGATED PIECES OF MATERIAL
Filed May 18, 1965     8 Sheets-Sheet 1
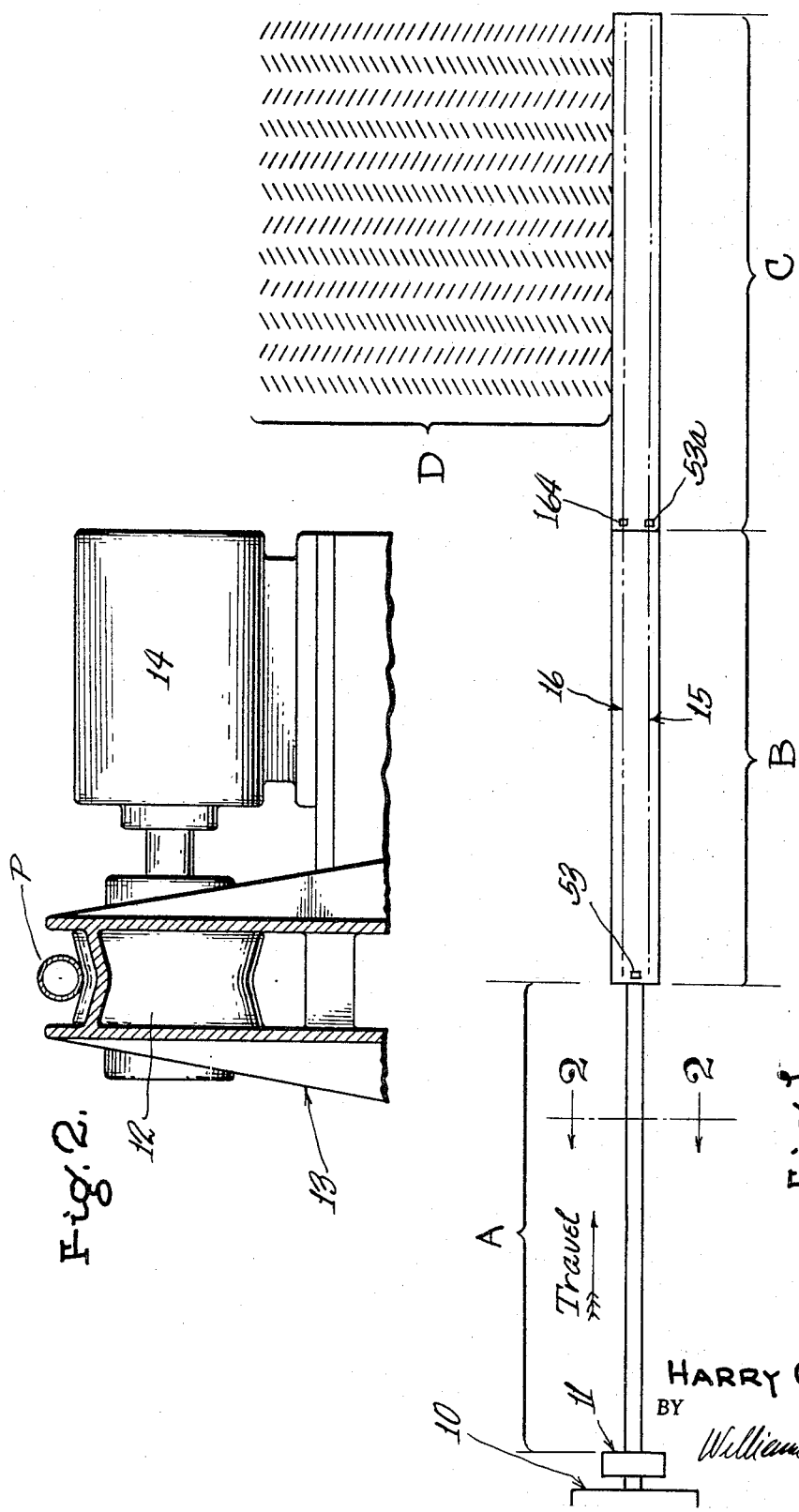
INVENTOR.
HARRY C. LEDEBUR
BY
Williams and Kresks
ATTORNEYS

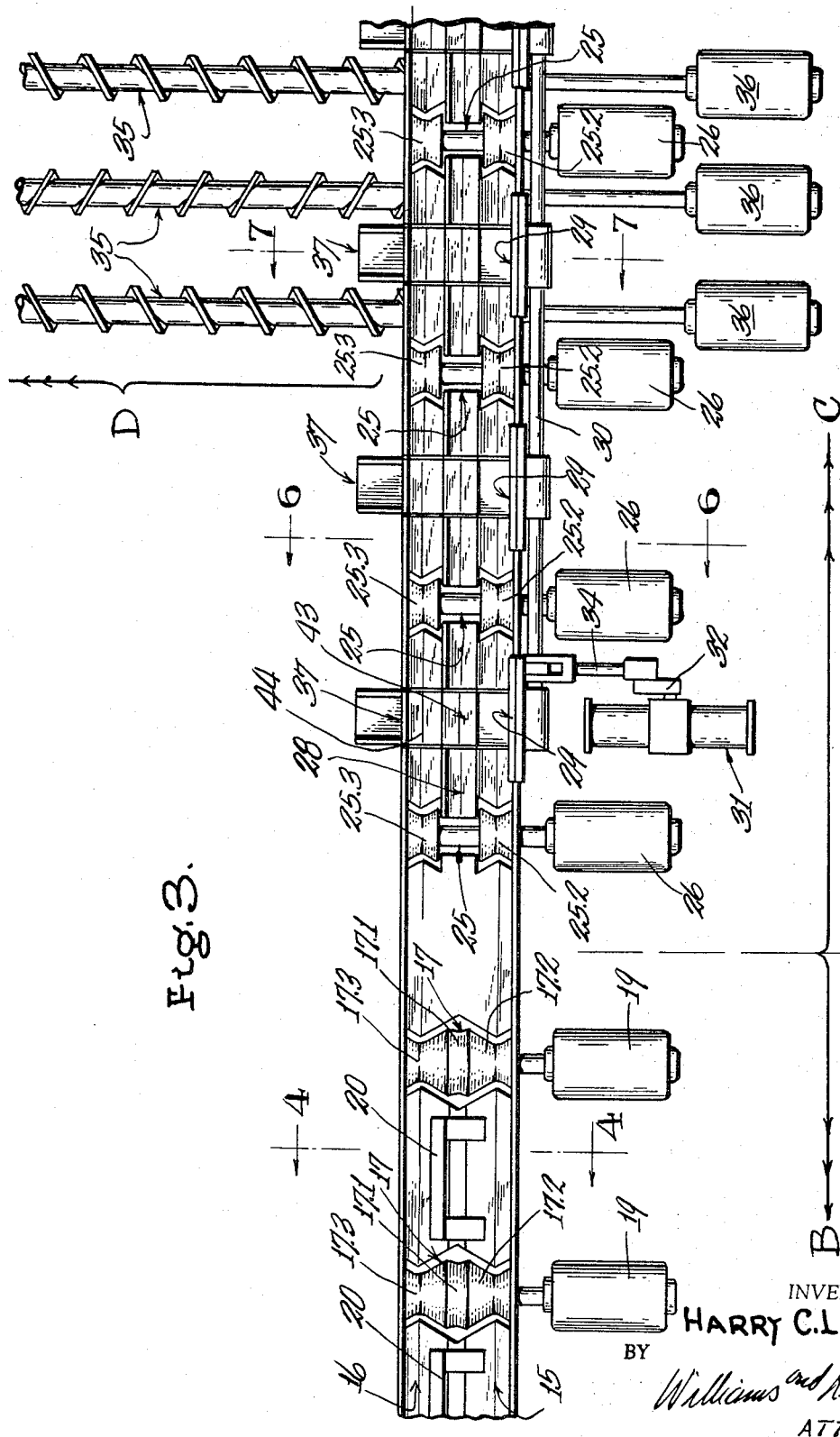

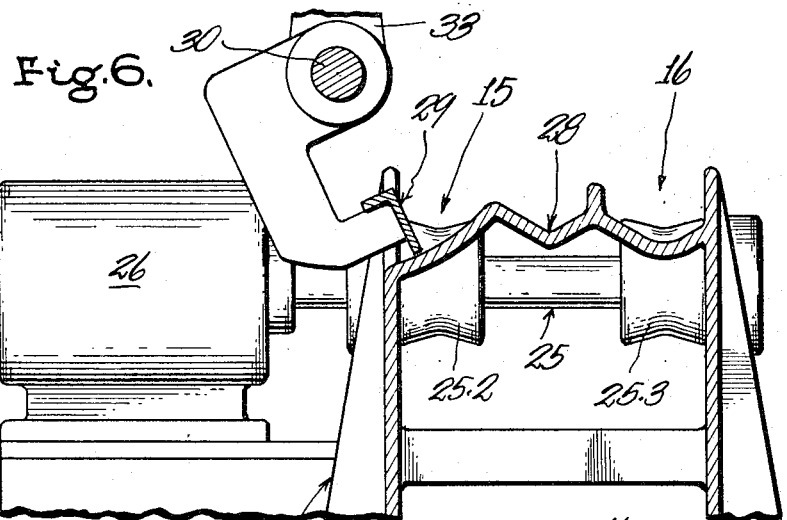
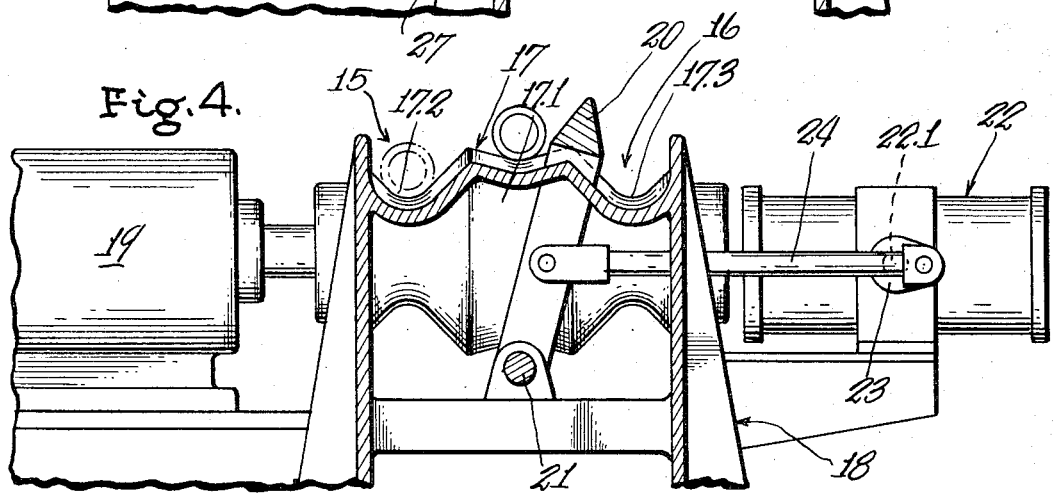
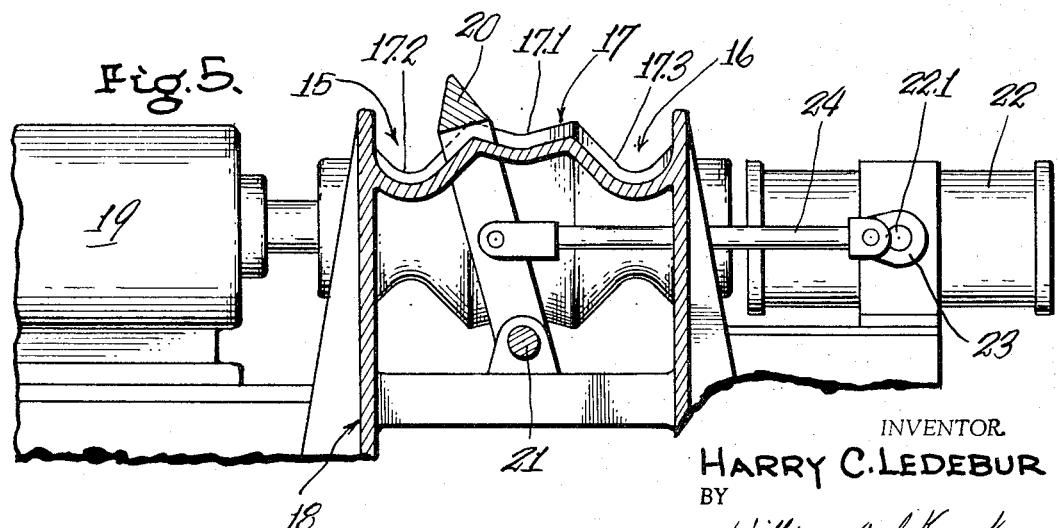

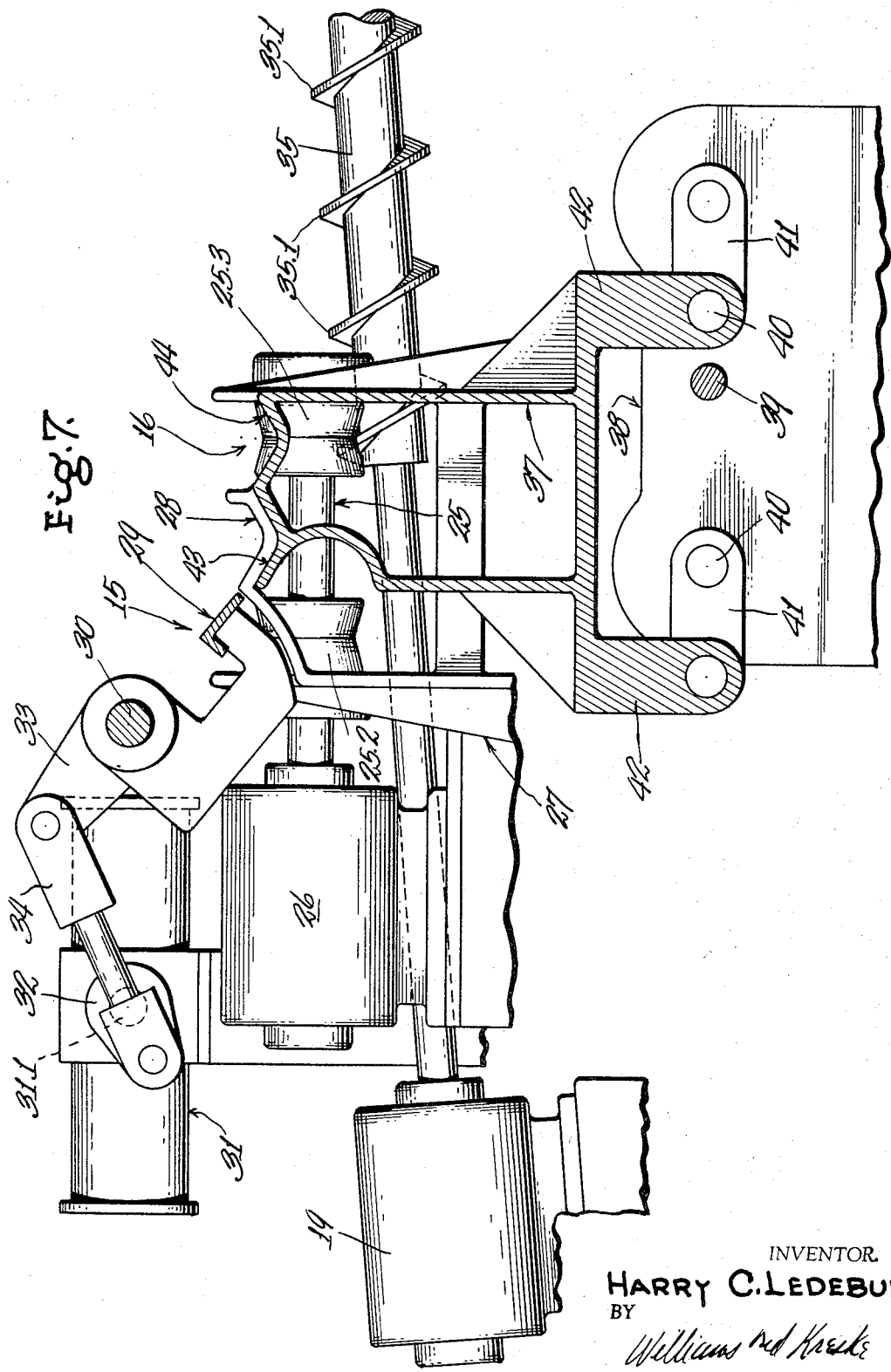

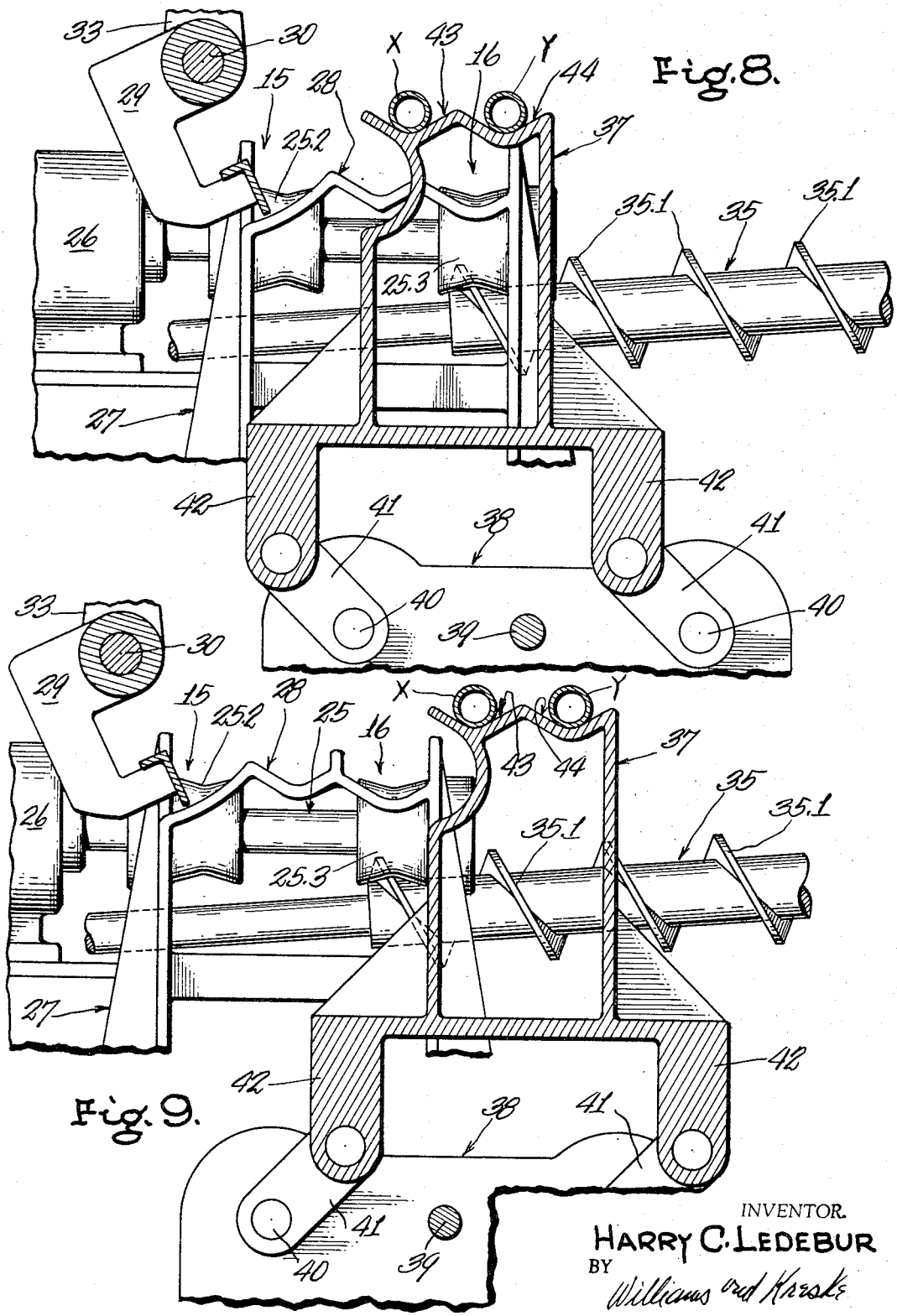

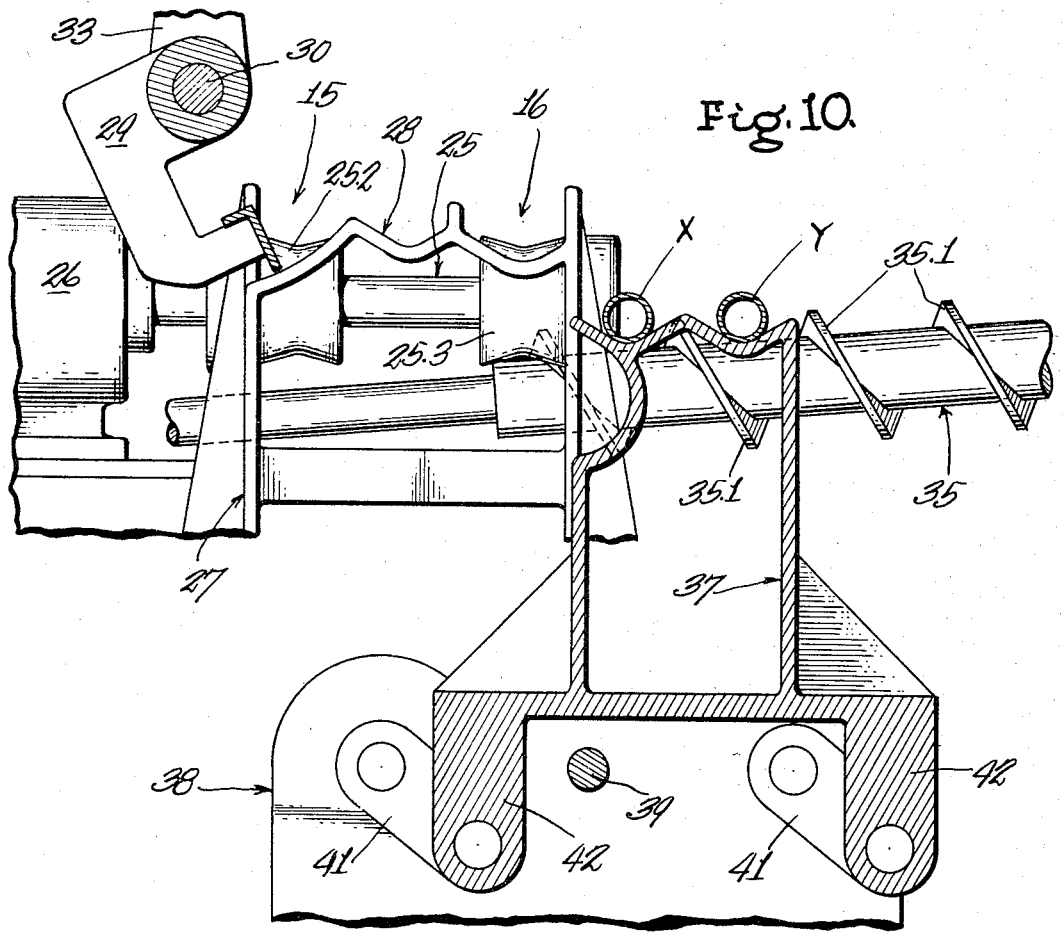

INVENTOR.
HARRY C. LEDEBUR
BY
Williams and Kreske
ATTORNEYS

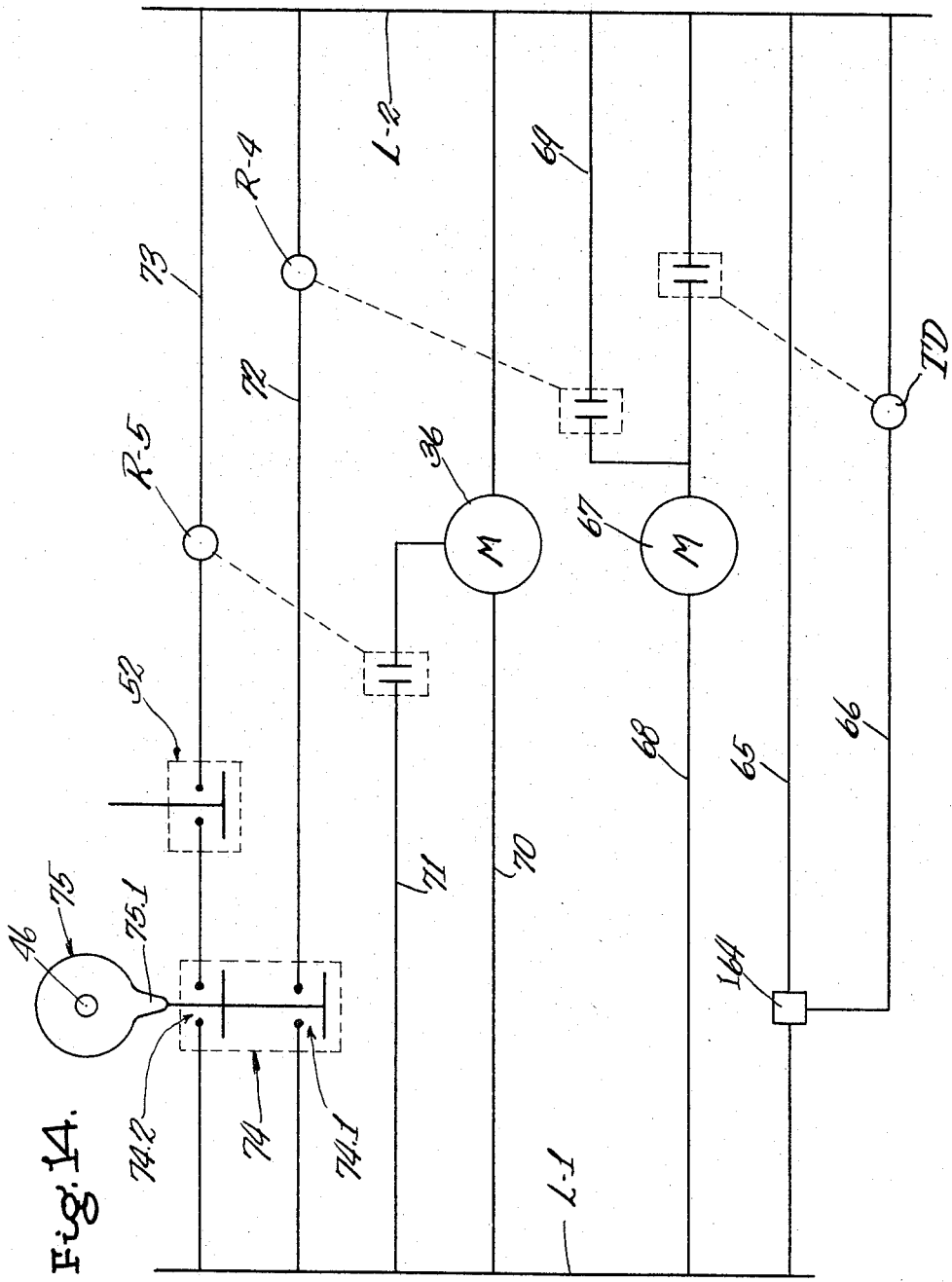

United States Patent Office 3,342,302
Patented Sept. 19, 1967

3,342,302
METHODS OF AND APPARATUS FOR HANDLING ELONGATED PIECES OF MATERIAL
Harry C. Ledebur, Youngstown, Ohio, assignor to The McKay Machine Company, Youngstown, Ohio
Filed May 18, 1965, Ser. No. 456,739
18 Claims. (Cl. 198—31)

The present invention relates to methods of and apparatus for handling elongated pieces of material, more particularly to apparatus for use with tube mills and the like and methods of operating the same, and the principal object of the invention is to provide new and improved methods and apparatus of the character described.

With the ever increasing demand for higher operating speeds, the handling of longitudinally moving sections of tubing emerging in close succession from a mill presents problems of great magnitude. The problems are compounded not only by mill discharge speeds of, at the present time, 1500 feet per minute, but by the fact that the tubing sections must be handled gently and with minimum space utilization.

The present invention provides for deceleration and subsequent transverse shifting of successive tubing sections emerging from a tube mill at speeds of up to 1500 feet per minute or faster and in a space approximately that heretofore required with mills having a discharge speed of 700 to 800 feet per minute. These and other advantages will readily become apparent from a study of the following description and from the drawings appended hereto.

Figure 13:
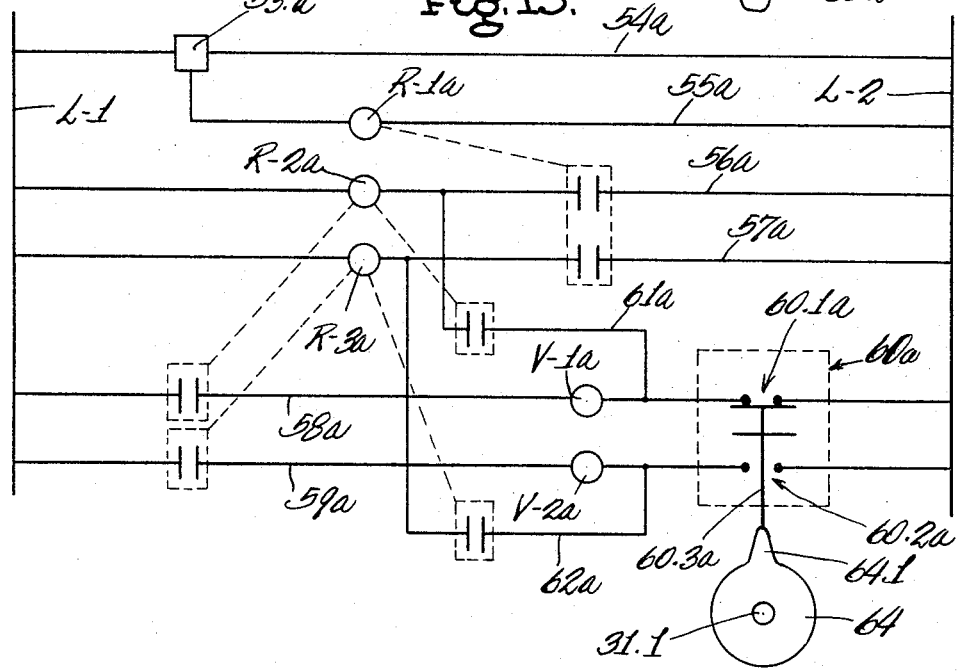

In the drawings accompanying this specification and forming a part of this application there is shown, for purpose of illustration, an embodiment which the invention may assume, and in these drawings:

FIGURE 1 is a diagrammatic plan view of apparatus embodying the present invention and fragmentarily illustrating the discharge end of a suitable tube mill, FIGURE 2 is an enlarged, fragmentary sectional view generally corresponding to the line 2—2 of FIGURE 1 and typical of the apparatus portion embraced by the bracket A, FIGURE 3 is an enlarged, fragmentary plan view of the portion of the apparatus at the juncture of the B, C, and D portions thereof, FIGURE 4 is a fragmentary enlarged sectional view generally corresponding to the line 4—4 of FIGURE 3 and typical of the apparatus portion embraced by the bracket B of FIGURE 1, FIGURE 5 is a view similar to FIGURE 4 but showing certain parts in another position, FIGURE 6 is a fragmentary enlarged sectional view generaly corresponding to the line 6—6 of FIGURE 3, FIGURE 7 is a fragmentary enlarged sectional view generaly corresponding to the line 7—7 of FIGURE 3 and typical of the apparatus portion C contiguous with the apparatus portion D, certain parts seen in FIGURE 7 being shown in a different position from that shown in FIGURE 6, FIGURES 8, 9 and 10 are fragmentary views, similar to FIGURE 7, but showing certain parts in different operational stages, FIGURE 11 is a fragmentary enlarged sectional view of a detail together with a diagrammatically illustrated electrical switch, and FIGURES 12, 13, and 14 are diagrammatic views of certain electrical control circuits.

With reference first to FIGURE 1, the reference character 10 represents the exit end of a conventional tube mill or the like which may discharge a continuous length of hot tubing in the direction of the arrow. At 11 there is represented a flying cut-off device of any suitable type which is adapted to sever the tube discharged from the mill 10 into pieces of the required length. From the cut-off 11, the tubing pieces move longitudinally in the direction of the arrow along the apparatus section A, from section A to section B, from section B to section C, and from section C transversely to section D, all in a manner hereinafter to be disclosed.

As illustrated in FIGURE 2, apparatus section A comprises a series of peripherally grooved rolls 12 rotatably carried by suitable roll stands 13. Rolls 12 are disposed in side-by-side relation to form a conveyor along which the tubing pieces P longitudinally travel, each of the rolls 12 preferably being driven by a motor 14 whose speed may be controlled for a purpose to be seen.

In order to provide a certain amount of longitudinal separation between adjoining tubing pieces, the rolls 12 of apparatus section A will preferably be driven at a peripheral speed somewhat in excess of that at which the tubing is discharged from the mill. Accordingly, as soon as a tubing piece lying in the apparatus section A is severed by the cut-off 11, such piece will be accelerated by the rapidly rotating roll 12 to provide a longitudinal space between the trailing end of such just severed piece and the leading end of the next successive piece.

Apparatus section B, see FIGURES 3 and 4, is similar to section A; however, where section A provides a single path for the tubing pieces, section B provides a central path aligned with the path of section A flanked by second tubing paths 15 and 16. Apparatus section B, like section A, is formed of a plurality of rolls 17 in side-by-side relation rotatably carried by roll stands 18. Rolls 17 have a central portion 17.1 similar to that of the rolls 12 of the apparatus section A and are driven by motors 19 preferably at about the same peripheral speed as rolls 12 so that tubing pieces will advance from the rolls 12 of section A to the central portion of the rolls 17 with no appreciable change in speed. Actually, rolls 17 may under some conditions be driven somewhat slower than rolls 12 since, while the former must accelerate the tubing pieces from the speed at which they leave the mill, the rolls 17 need only maintain such accelerated piece movement.

It is an important feature of the present invention that the paths 15, 16 are provided by respective, reduced diameter end portions 17.2, 17.3 of the rolls 17. In the present instance, such end portions have approximately ½ the peripheral size of intermediate roll portion 17.1 so that the rolls 17 will tend to cause the pieces in paths 15, 16 to travel at one half of the speed of travel of the pieces in the central path provided by the roll portion 17.1.

Means are provided for transversely shifting pieces of tubing from the path provided by the roll portion 17.1 to respective paths provided by the roll portions 17.2, 17.3 and as herein disclosed, such means comprises a plurality of fingers 20 secured to a rock shaft 21 beneath the rolls 17 and projecting upwardly between adjoining ones of such rolls.

Means are provided for shifting such fingers 20 from the position seen in FIGURE 4 to the position seen in FIGURE 5, and while many suitable devices could be used, it is preferable to employ a commercially available device 22 known as a rotary air actuator which is manufactured by Flo-tork Inc., of Orrville, Ohio, and described in their bulletin RAA–63. In brief, device 22 provides a rotatable output shaft 22.1 which, in this instance, rotates 180 degrees when air under pressure is admitted to one end of the device and which reversely rotates 180 degrees when air pressure is admitted to the other device end. Secured to shaft 22.1 is a crank 23 connected to one of the fingers 20 by a link 24. Since, as before mentioned, all of the fingers 20 are affixed to the rock shaft 21, the fingers will be shifted in unison between the positions seen in FIGURES 4 and 5.

Operation of apparatus section B will be as follows: Assuming the fingers 20 to be positioned as seen in FIGURE 4, a piece of tubing P (seen in full lines) will travel along the intermediate roll section 17.1 as it emerges form the apparatus section A. When the entire length of tubing is within the apparatus section B, as determined by sensing means later to be disclosed, fingers 20 will be shifted by device 22 from the position seen in FIGURE 4 to the position seen in FIGURE 5. This will shift the tubing piece P (now seen in phantom lines) from the intermediate roll portion 17.1 to the roll end portion 17.2 wherein it will continue its longitudinal travel but now along the path 15.

It will be pointed out at this time that since the fingers 20 are connected to the device shaft 22.1 by means of the crank 23, the fingers are shifted with a harmonic motion. Thus, the fingers are gradually accelerated from rest to maximum speed and then gradually decelerated to rest again. This is an important feature of the invention since by shifting the fingers 20 and thus the tubing pieces transversely with a harmonic motion, there is less danger of injurying the pieces which, at this time, are quite susceptible to damage as a result of their heated condition.

When the next successive piece of tubing traveling along the roll intermediate portion 17.1 is wholly within the apparatus section B, the fingers 20 will be returned from the position seen in FIGURE 5 to the position seen in FIGURE 4. This will shift such next successive tubing piece from the intermediate roll portion 17.1 to the roll end portion 17.3 wherein it will continue its longitudinal travel but now along the path 16. The above operations will be repeated with successive tubing pieces as will be clear. As soon as a tubing piece is deposited on the roll portions 17.2, 17.3 (paths 15, 16) it will be understood that their speeds will gradually be reduced to that provided by such rotating roll portions or, in the present case, approximately one half of the speed they attained on the roll intermediate portions 17.1.

Apparatus section C, as best seen in FIGURES 3 and 6, provides a continuation of the paths 15, 16 of section B by means of rolls 25 driven by motors 26 and rotatably supported by roll stands 27. As before, rolls 25 are spaced longitudinally along the path of travel of the tubing pieces and each is similar to the roll 17 except that the previously disclosed intermediate roll portion 17.1 is omitted leaving roll portions 25.2, 25.3 corresponding to the roll portions 17.2, 17.3, respectively, of the rolls 17.

As best seen in FIGURE 6, roll stands 27 provide a fixed skid trough 28 intermediate the paths 15, 16 for receiving a piece of tubing shifted transversely from the path 15. The means for shifting a tubing piece from the path 15 provided by the roll portions 25.2 to the skid trough 28 comprises a plurality of kickers 29 spaced along the apparatus section C. Kickers 29 are secured to a rock shaft 30 for simultaneous movement from the position seen in FIGURE 6 to the position seen in FIGURE 7.

For effecting rocking movement of the shaft 30, a device 31 similar to the previously described device 22 is employed; however, device 31 has an output shaft 31.1 which rotates 360 degrees in one direction when air under pressure is admitted to one device end and rotates 360 degrees in the opposite direction when air pressure is admitted to the other device end. Secured to shaft 31.1 is a crank 32 which is connected to a lever 33 on the rock shaft 30 by a link 34.

It will be noted that the kickers 29 are shifted by harmonic motion similar to the fingers 20 previously described because such kickers are similarly crank driven. Here again, the purpose of the harmonic motion is to minimize damage to the hot pieces of tubing as they are shifted by the kickers.

As best seen in FIGURES 1, 3, and 7, apparatus section D comprises a plurality of shafts 35 in side-by-side, parallel relation extending transversely of the apparatus section C. Such shafts are disposed beneath the rolls 25 and are inclined upwardly, in the position of parts seen in FIGURE 7, from left to right. One end of each shaft 35 is connected to a drive motor 36 on one side of the section C while the shafts on the opposite side of the section are provided with external, spiral fins 35.1. As will appear, the spaces between adjoining shaft fins 35.1 are adapted to receive respective tubing pieces from the apparatus section C, such pieces extending transversely of the shafts 35 and, during rotation of the latter, being advanced longitudinally thereof, or from left to right as viewed in FIGURE 7. In order not to induce longitudinal movement of the tubing pieces as a result of rotation of the shafts 35, alternate shafts are adapted to be rotated in opposite directions and, to insure that the fins 25.1 advance the pieces in the same direction despite such opposite rotation, the fins on alternate shafts are spiraled in opposite directions. Thus, while the fins on alternate shafts 35 are spiraled to the right, the fins on intermediate shafts 35 are spiraled to the left. Although not shown, any suitable mechanical interconnection may be provided between the shafts 35 to insure that they remain in registry with each other so that the spaces between the fins 35.1 of all shafts 35 are at all times transversely aligned for reception of tubing pieces.

Means are provided for transferring two tubing pieces simultaneously from the apparatus section C to the apparatus section D and as best seen in FIGURES 3 and 7, such means comprise a plurality of cradles 37 disposed intermediate the spaced-apart rolls 25. Disposed beneath the apparatus section C are a series of gear reducers 38 each having an input shaft 39 and double output shafts 40. The reducers 38 are disposed with their shafts 39, 40 in aligned relation with a reducer 38 disposed between adjoining cradles 37. Secured to each reducer output shaft 40 adjacent a cradle 37 is a crank 41. Each cradle has a depending portion 42 pivotally connected to respective cranks 41 whereby such cradle can be shifted in an orbital path from the position seen in FIGURE 7 through the positions seen in FIGURES 8, 9, and 10. Since the reducers 38 have their input shafts 39 aligned and connected together, it will be understood that each of the reducers will function in unison to shift each of the cradles simultaneously in the manner above disclosed. Although not shown in the drawings thus far described, a suitable electric motor or the like will be employed to drive the series of reducers 38. In the normal position of parts seen in FIGURE 7, each cradle 37 provides a trough 43 positioned slightly beneath the skid trough 28 and a trough 44, which may be considered a movable skid trough, positioned slightly below the upper surface of the roll portions 25.3. Thus, the cradles will not interfere with movement of a piece of tubing along either the skid trough 28 or along the rolls 25.3.

With the cradles 37 in their normal position seen in FIGURE 7, with the kickers in the normal position seen in FIGURE 6, and with the rolls 25 and the shafts 35 operating at the proper speeds, it will be assumed that a piece of tubing is traveling along the path 15 from the apparatus section B to the apparatus section C. When such tubing piece is wholly contained within the apparatus section C (such piece traveling along the roll sections 25.2), device 31 will be actuated by means later to be disclosed to shift the kickers 29 from the position seen in FIGURE 6 to the position seen in FIGURE 7 and back to the position of FIGURE 6. This, it will be clear, will transversely shift the tubing piece from the path 15 to the skid trough 28. In traveling along the path 15, the tubing piece will have been reduced to approximately half of its original speed acquired during travel along apparatus section A and following its disposition as above described into the skid trough 28, its longitudinal movement will gradually be frictionally reduced to approximately zero.

As previously described, the next successive tubing piece will progress along the path 16 from the apparatus section B to the apparatus section C and when such piece is wholly contained within the apparatus C (such piece traveling along the roll sections 25.3), the drive motor for the reducers 38 will be actuated by means later to be disclosed to shift the cradles 37 from the position seen in FIGURE 7 successively through the positions of FIGURES 8, 9 and 10, and once again to the normal position of FIGURE 7. As the cradles are raised to the position seen in FIGURE 8, note that the cradle trough 43 will carry with it a tubing piece X previously in the skid trough 28. Similarly, the cradle trough 44 will carry with it a tubing piece Y previously moving along the roll portions 25.3 at a speed approximately half of its original speed acquired during its travel along apparatus section A. As the cradles successively move through the positions seen in FIGURE 8, 9 and 10, longitudinal movement of the tubing piece Y in cradle trough 44 will gradually be frictionally reduced to approximately zero.

Upon movement of the cradles 37 through the position of parts seen in FIGURE 10, it will be noted that the tubing pieces X, Y will be deposited on the rotating shafts 35 between adjoining fins 35.1 for movement of such pieces to the right to a storage area or to further processing apparatus not herein disclosed. During movement of the pieces along the shafts 35, such pieces will be allowed to cool. When cradles 37 have returned to the normal position seen in FIGURE 7, their orbital movement will be stopped to await the next cycle of operation.

It will be understood that depending upon how fast successive tubing pieces reach positions wholly within apparatus section C, the next tubing piece may be kicked into the skid trough 28, as before described, before the cradles have returned to their normal positions seen in FIGURE 7. Indeed, under high-speed operation, the kickers 29 could, without interference, kick a piece into the skid trough 28 as soon as the cradles have reached the position seen in FIGURE 8.

Since the shafts 35 rotate continuously while the cradles 37 operate intermittently in accordance with delivery of tubing pieces to the apparatus section C, a condition could arise where the cradles would attempt to deposit a pair of tubing pieces directly upon the shaft ribs 35.1, rather than between them, with attendant damage to such pieces. To obviate such a situation, means are provided for sensing an out-of-synchronization relationship between the shafts 35 and the moving cradles and for momentarily accelerating rotation of such shafts until they reach synchronization with the moving cradles.

As viewed in FIGURE 11, a pair of shafts 45, 46 are disposed in spaced end-to-end relationship, the shaft 45 being connected to and rotating in unison with the shafts 35 of the apparatus section D while the shaft 46 is connected to and rotates in unison with the output shafts 40 of the reducers 38. The terminal end of shaft 46 is splined at 47 and slidable axially along such shaft splines is a thimble 48 having a radially enlarged, annular collar 49. A coil spring 50 urges the thimble to engagement with the shaft 45, the abutting portions of the thimble and the latter shaft providing respective mating surface 51 disposed at an angle to the axes of the shafts 45, 46.

When the shafts 35 and the cradles 37 are in precise synchronization, the mating surfaces 51 of the shaft 45 and the thimble 48 will be in face-to-face engagement as shown in FIGURE 11. When, however, the shafts 35 and the cradles are not in synchronization, the shafts 45, 46 will be relatively angularly displaced from the positions seen in FIGURE 11 and, because of the angularity of the surfaces 51, the thimble 48 will be displaced to the right against the pressure exerted by the spring 50. Such displacement of the thimble will, in the present embodiment, close the contacts of a limit switch 52 whose actuator is engaged with the thimble collar 49. When synchronization between the shafts 35 and the cradles 37 once again occurs, thimble 48 will be shifted to the left by its spring 50 to re-open the contacts of limit switch 52 as shown in FIGURE 11. The manner in which switch 52 functions will later be described in connection with the control circuitry of FIGURE 14.

FIGURE 12 illustrates a control circuit for effecting operation of the device 22 of the apparatus section B and as therein shown, a sensing device 53 is in a circuit 54 extending between electric power lines L-1, L-2. While many types of sensing devices could be used, it is preferable to employ one of the type which is heat-responsive. Device 53 is connected to line L-2 via a circuit 55, the device being adapted to pass current from L-1 to L-2 when it is not being subjected to heat. The device 53 is adapted to be disposed at the entry end of apparatus section B (FIGURE 1) so that it is subjected to the heat from a tubing piece passing thereover. In operation, as soon as a tubing piece has passed beyond the sensing device 53, current will flow in the circuit 55 hereinabove mentioned and through the solenoid actuator of a relay R-1.

Interposed in respective circuits 56, 57 across the lines L-1, L-2 are the solenoid actuators of relays R-2 and R-3 along with the illustrated, normally open contacts of the relay R-1. Interposed in respective circuits 58, 59 across the lines L-1, L-2 are the solenoid actuators V-1, V-2 of a suitable solenoid valve which is operably connected to a source of air pressure and to the device 22 shown in FIGURE 4. When the actuator V-1 is energized, air will be fed to one end of device 22 to effect rotation of its shaft 22.1 in one direction. Similarly, when actuator V-2 is energized, air will be fed to the other end of device 22 to effect reverse rotation of its shaft 22.1. Interposed in the L-2 side of respective circuits 58, 59 are contacts 60.1, 60.2 of a limit switch 60 which is of the type which alternately closes one set of contacts and opens the other each time its actuator 60.3 is pushed inwardly. Outward movement of such actuator does not effect contact movement.

Extending from circuits 56 and 57, as shown, to circuits 58, 59 are respective holding circuits 61 and 62. Interposed in circuits 61 and the L-1 side of circuit 58 are respective normally open contacts of relay R-2 while interposed in circuits 62 and the L-1 side of circuit 59 are respective, normally open contacts of relay R-3. Completing this control circuit, the actuator 60.3 of limit switch 60 is engaged with a cam 63 which may be mounted on the shaft 22.1 of the device 22. Cam 63 has lobes 63.1, 63.2 which press inwardly on the switch actuator 60.3 when the device reaches either of its extreme positions.

Turning now to FIGURE 13, this circuit is similar to that shown in FIGURE 12 and therefore, corresponding parts are identified with the same reference characters but with the suffix *a* added. FIGURE 13 differs from FIGURE 12 in the following respects: Firstly, the sensing device 53*a* (FIGURE 1) is disposed at the entry end of apparatus section C, in path 15, so that it is subjected to the heat from a tubing piece passing thereover. Secondly, the relays R-2*a* and R-3*a* are of the time delay type; i.e., the type whose contacts close not immediately upon energization of its actuator but a relay period after such energization. For reasons to appear, the delayed operation of relays R-2, R-3 will be adjustable in any suitable manner.

The valve controlled by solenoid actuators V-1*a*, V-2*a* will be operably connected to a source of air pressure and to the device 31 of FIGURE 6 so that when actuator V-1*a* is energized, air pressure will be fed to one end of device 31 to effect rotation of its shaft 31.1 in one direction and when actuator V-2*a* is energized, air will be fed to the other end of the actuator to effect reverse rotation of its shaft 31.1. Finally, the actuator 60.3*a* of limit switch 60*a* is engaged with a cam 64 which may be mounted on the shaft 31.1 of the device 31. Cam 64 has a lobe 64.1 which presses inwardly on the switch actuator 60.3a when the device reaches either of its extreme positions.

Turning now to FIGURE 14, there is shown a sensing device 164 connected across power lines L–1, L–2 by a circuit 65. Device 164 may be identical to devices 53, 53a previously described and such device may be disposed at the entry end of apparatus section C (FIGURE 1) in path 16. Device 164 is also connected to line L–2 via a circuit 66 in which is interposed the solenoid actuator TD of an adjustable time delay relay. As will later appear, this relay is similar to relays R–2a, R–3a, being of the type whose contacts close a predetermined time after energization of the actuator and, for reasons to be seen, the degree of delay is adjustable in any suitable manner.

As previously mentioned in connection with FIGURE 7, the aligned input shafts 39 of the reducers 38 are adapted to be driven by a suitable electric motor, such motor being indicated at 67 in FIGURE 14 connected across the power lines L–1, L–2 by means of a circuit 68. Interposed in the L–2 side of circuit 68 are the normally open contacts of the time delay relay TD previously mentioned. A shunt circuit 69 bypasses the contacts of relay TD and interposed in such shunt circuit are the normally open contacts of a relay R–4 later to be disclosed.

A previously mentioned drive motor 36, disclosed in connection with FIGURES 3 and 7, is shown connected across the line L–1, L–2 via a circuit 70. While only one motor 36 is shown, it will be understood that all will be connected in the manner herein illustrated for simultaneous operation. Since motors 36 normally operate continuously via circuit 70, no means for interrupting this circuit is shown. Motors 36 are also connected to the line L–1 via a circuit 71 in which are interposed the normally open contacts of a later to be described relay R–5. The L–1 side of circuit 70 may be designated as the normal speed circuit of motors 36 while the circuit 71 may be designated as a high-speed circuit of such motors.

Extending between the lines L–1, L–2 are circuits 72, 73, in which are respectively interposed the solenoid actuators of the previously mentioned relays R–4 and R–5. Also interposed in the circuits 72, 73, respectively, are the contacts 74.1 and 74.2 of a limit switch 74. The actuator 74.3 of switch 74 is engaged with a cam 75 which may be driven by the shaft 46 of FIGURE 11 or by one of the reducer output shafts 40. Cam 75 has a lobe 75.1 which, in the normal position of parts shown, holds contacts 74.1, 74.2 open. When, however, cam 75 rotates to move its lobe away from the switch actuator, the switch contacts 74.1, 74.2 will close until they are once again opened by abutment of the cam lobe with the switch actuator. Finally, interposed in circuit 73, are the contacts of switch 52 previously described in connection with FIGURE 11.

The function of the control circuits of FIGURES 12, 13, and 14 will now be described in connection with the previously described apparatus. It will be assumed that the fingers 20 are positioned as seen in FIGURE 4, that the kickers 29 are positioned as seen in FIGURE 6, that the cradles 37 are positioned as seen in FIGURE 7, that all of the rolls 12, 17, 25 and the screw shafts 35 are rotating, and that a hot piece of tubing has emerged from the mill 10 and has just been severed to the proper length by the flying cut-off 11.

The now severed piece of tubing will travel along the rolls 12 of apparatus section A and on to the intermediate section 17.1 of the rolls 17 of the apparatus section B. As previously mentioned, such piece will be accelerated in speed by the rolls 12, 17 to open up a space between its trailing end and the leading end of the next successive piece emerging from the mill. As soon as the trailing end of this first tubing piece passes beyond the sensing device 53 (FIGURES 1 and 12) current will momentarily flow in circuit 55 and energize the relay actuator R–1 and close its contacts in circuits 56 and 57. The closing of these contacts will energize the relay actuators R–2 and R–3. Energization of R–2 will close its contacts in respective circuits 58 and 61, and the energization of R–3 will close its contacts in respective circuits 59 and 62.

The closing of the contacts in circuits 59, 62 will not energize the valve actuator V–2 since the limit switch contacts 60.2 are open; however since limit switch contacts 60.1 are closed, the closing of the relay contacts in circuits 58, 61 will energize the valve actuator V–1 and maintain relay R–2 energized through circuit 61 despite deenergization of relay R–1. Energization of valve actuator V–1 will admit air pressure to device 22 of FIGURE 4 in manner to shift the fingers 20 from the position of FIGURE 4 to the position of FIGURE 5. When the device 22 reaches the position of FIGURE 5, cam lobe 63.2 will press inwardly on the switch actuator 60.3 to thus open its contacts 60.1 and close its contacts 60.2. The opening of contacts 60.1 will deenergize relay R–2 and valve actuator V–1 while the closing of contacts 60.2 will have no effect since relay R–3 is at this time deenergized by the earlier deenergization of the relay R–1 and the opening of its contacts in circuit 57. Thus, the fingers 20 will remain in the position seen in FIGURE 5 until the next tubing piece is discharged from the mill.

Movement of the fingers 20 from the position seen in FIGURE 4 to the position seen in FIGURE 5 will, as previously mentioned, shift the piece of tubing from the intermediate portion 17.1 of rolls 17 to their end portions 17.2. This disposes such piece in path 15 and, as previously described, the lower peripheral speed of the roll portions 17.2 gradually reduces the speed of movement of the tubing piece.

This first tubing piece will travel along the path 15 into the apparatus section C (along the roll portions 25.2 of the latter), until the trailing end of the piece passes the sensing device 53a (FIGURES 1 and 13) at the entry end of such apparatus section. Current will thus momentarily flow in circuit 55a to energize the relay R–1a and close its contacts in respective circuits 56a, 57a. The closing of these contacts will energize the time delay relays R–2a, R–3a and, after a predetermined adjustable time delay, the contacts of relay R–2a in circuits 58a and 61a, respectively will close as will the contacts of relay R–3a in respective circuits 59a, 62a.

The closing of the contacts in circuits 59a, 62a will not energize the valve actuator V–2a since the limit switch contacts 60.2a are open; however, since limit switch contacts 60.1a are closed, the closing of the relay contacts in circuits 58a, 61a will energize the valve actuator V–1a and maintain relay R–2a energized through circuit 61a despite deenergization of relay R–1a. Energization of valve actuator V–1a will admit air pressure to device 31 of FIGURE 6 in a manner to shift the kickers from the position of FIGURE 6 to the position of FIGURE 7 and return. When the device 31 once again reaches the position of FIGURE 6, cam lobe 64.1 will press inwardly of the switch actuator 60.3a to thus open its contacts 60.1a and close its contacts 60.2a. The opening of contacts 60.1a will deenergize relay R–2a and valve actuator V–1a while the closing of contacts 60.2a will have no effect since relay R–3a is at this time deenergized by the earlier deenergization of the relay R–1a and the opening of its contacts in circuit 57a. Thus, the kickers 29 will remain in the position seen in FIGURE 6 until another tubing piece moves along the path 15.

Movement of the kickers 29 from the position seen in FIGURE 6 to the position seen in FIGURE 7 will, as previously described, shift this first tubing piece from the roll portions 25.2 (path 15) to the fixed skid trough 28 wherein longitudinal movement of the piece will be frictionally retarded and finally stopped somewhere along the apparatus section C. Since the longer the tubing piece is allowed to travel along the roll portions 25.2 of the path 15 before it is kicked into the skid trough 28, the further to the right (as viewed in FIGURE 1) will be its stopping position in apparatus section C. Thus, it will readily be apparent that by adjusting the time delay periods of relays R–2a, R–3a, the stopping position of such piece along the apparatus section C can be adjusted as required.

As soon as the next or second piece of tubing has emerged from the mill 10 and has been severed by the cut-off 11, it will travel along the rolls 12 of apparatus section A and onto the intermediate portion 17.1 of the rolls 17 of the apparatus section B. Upon passage of the trailing end of this second tubing piece beyond sensing device 53, relays R–1, R–2 and R–3 of FIGURE 12 will be energized as previously described. This time, however, since switch contacts 60.1 are open and 60.2 are closed, valve actuator V–2 rather than V–1 will be energized. Energization of valve actuator V–2 will cause the valve to admit air to device 22 to rotate its shaft in the opposite direction from before thus shifting the fingers 20 from the position seen in FIGURE 5 to that disclosed in FIGURE 4. Movement of the fingers 20 to the position of FIGURE 4 will shift the second tubing piece from the intermediate portions 17.1 of rolls 17 to their end portions 17.3. This disposes such tubing piece in path 16 wherein its speed will gradually be reduced to the peripheral speed of the roll portions 17.3. When the fingers 20 reach the position of FIGURE 4, cam lobe 63.1 will press upon the switch actuator 60.3 to open the contacts 60.2 and close the contacts 60.1. This will deenergize the relay R–3 and the valve actuator V–2 thus preparing the circuit of FIGURE 12 for arrival of the next successive tubing piece wherein the first-described operation of this circuit will be repeated.

The second tubing piece will travel along path 16 into the apparatus section C (along the roll portions 25.3 of the latter) until the trailing end of the piece passes the sensing device 164 (FIGURES 1 and 14) at the entry end of such apparatus section. Current will thus momentarily flow in the circuit 66 energizing the time delay relay TD. After a time interval, the contacts of relay TD in circuit 68 will close thus energizing the motor 67 of the cradle reducers 38. Energization of the motor 67 will shift the cradles 37 from the position of FIGURE 7 through the positions of FIGURES 8, 9, and 10, thus transferring the tubing piece X (the first tubing piece) from the skid trough 28 and the tubing piece Y (the second tubing piece) from the roll portions 25.3 to the screw shafts 35 of the apparatus section D, all as previously described. As soon as the reducers 38 begin to rotate, cam lobe 75.1 will release the switch actuator 74.3 thus allowing the switch contacts 74.1 and 74.2 to close. The closing of contacts 74.1 in circuit 72 will energize relay R–3 to close its contacts in the shunt circuit 69. This will maintain motor 67 in operation after current ceases to flow in the circuit 66.

The closing of switch contacts 74.2 may or may not cause current flow through circuit 73 depending upon the following circumstances: If the cycle of operation of the cradles 37 is such that they are properly synchronized with the shafts 35 so that the tubing pieces will be deposited between the fins 35.1, the contacts of the relative position switch 52 (see also FIGURE 11) will remain open and prevent current flow through the circuit 73. If, however, the cradles 37 and the shafts 35 are not in synchronization, the relative position switch contacts will close thus causing current flow in circuit 73 and energizing the relay R–5. With relay R–5 energized, its contacts in circuit 71 will close thus completing this high-speed circuit to the motors 36 of the shafts 35. Shafts 35 will operate at an accelerated speed until synchronization of the shafts and the cradles is achieved, as determined by the opening of the switch contacts 52. This will deenergize relay R–5 and open its contacts in the high-speed circuit 71 to thus return the shaft motors 36 to their normal speed.

Upon return of the cradles 37 to the position of FIGURE 7, cam lobe 75.1 will open the switch contacts 74.1, 74.2. The opening of switch contacts 74.2 will prevent further activation of the high-speed circuit 71 while the opening of contacts 74.1 will deenergize the relay R–4 thus opening its contacts in shunt circuit 69 and terminating operation of the cradle reducer motors 67 until sensing device 164 is once again activated by passage of the trailing end of another tubing piece along the path 16.

Upon movement of the next tubing piece along the path 15 past the sensing device 53a, the valve actuator V–2 (through relay R–3a and its contacts in circuits 59a, 62a) rather than valve actuator V–1a will be energized since contacts 60.2a of switch 60a are now closed while contacts 60.1a are now open. This will effect operation of the device shaft 31.1 in the opposite direction from before thus causing the kickers 29 to move once again from the position of FIGURE 6 to the position of FIGURE 7 and return. Upon return of the kickers to the position of FIGURE 6, cam lobe 64.1 will once again trip switch 60a thereby opening its contacts 60.2a to deenergize relay R–3a and valve actuator V–2a and closing its contacts 60.1a to prepare the circuit for the next arrival of a tubing piece along the path 15.

While the present invention has been described in connection with tubing, it will readily be apparent that it may well be used with pipe, bar stock, or other elongated, longitudinally moving pieces of material. Such material pieces could be handled hot, as herein disclosed, or cold, depending on circumstances. Obviously, when cold material pieces are being handled, suitable sensing devices, other than the heat-sensitive ones herein disclosed, would be employed.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. The method of handling elongated pieces of pipe and the like traveling longitudinally along a predetermined path in close succession at high speed, which comprises transversely shifting alternate pieces from said path to respective second paths in side-by-side spaced relation, reducing the speed of travel of said pieces in said second paths to a predetermined level, alternately transferring said pieces to respective skid troughs wherein their speeds are reduced from said predetermined level to zero, and transversely shifting two pieces from respective skid troughs simultaneously to a device along which such pieces are transversely movable.

2. The method of claim 1 wherein at the end of travel through respective second paths aforesaid, said pieces are reduced to a speed approximately one half of their predetermined path speed.

3. Apparatus for handling elongated pieces of pipe and the like, comprising a plurality of elongated rolls in side-by-side relation forming a conveyor and the intermediate portions of said rolls providing a first conveyor path and the end portions of said rolls providing respective second conveyor paths each for longitudinally transporting said pieces, means for rotating the intermediate portion of each roll and its end portions at the same rotational speeds, the intermediate portions of said rolls being of relatively large diameter wherein they have a relatively high peripheral speed for transporting said pieces in said first path at relatively high speed and the end portions of said rolls being of relatively small diameter wherein they have a relatively low peripheral speed for transporting said pieces in said second paths at relatively low speed, and means for shifting successive pieces from said first path to alternate second paths.

4. The construction of claim 3 wherein the peripheral speed of said end roll portions is approximately one half that of said intermediate roll portions to provide for longitudinal transport of said pieces in said second paths at a speed approximately one half of the speed of transport of said pieces in said first path.

5. The construction of claim 3 wherein said last-mentioned means comprise a plurality of fingers spaced longitudinally of said first path and said fingers being interposed between respective adjoining rolls aforesaid, said fingers being shiftable from one side of said first path to the other side thereof for shifting said pieces from said first path to said second paths.

6. Apparatus for handling elongated pieces of pipe and the like, comprising means providing a pair of paths in spaced, side-by-side relation and successive pieces moving longitudinally along alternate paths aforesaid, a skid trough in side-by-side relation with said pair of paths and along which a piece travels longitudinally under frictional retardation, means for transversely shifting a piece from one of said paths to said skid trough, means adjacent said skid trough providing a transverse path along which said pieces are transversely movable, and means for simultaneously transferring a piece from said skid trough and a piece from the other of said pair of paths to said transverse path.

7. The construction of claim 6 wherein said last-mentioned means provides a second skid trough along which a piece from said other path of the pair of paths aforesaid travels longitudinally under frictional retardation.

8. The construction of claim 7 wherein each piece travels along respective skid troughs approximately the same distance before stopping.

9. The construction of claim 8 wherein kickout means transversely shifts a piece from said one path to said skid trough, wherein means is responsive to the position of such piece in said one path and initiates operation of said kickout means after a time delay, and wherein said time delay is variable to adjust the stopping position of said one piece.

10. Apparatus for handling elongated pieces of pipe and the like, comprising means providing a pair of paths in spaced, side-by-side relation along which said pieces longitudinally travel, conveyor means having pockets for receiving respective pieces and said conveyor means moving at a predetermined rate for transversely shifting said pieces away from said paths, transfer means moving at a predetermined rate for shifting two pieces at a time to said conveyor means, and sensing means responsive to the relative positions of said conveyor means and said transfer means for momentarily varying the relative rates of movement of the latter and said conveyor means, when synchronization therebetween is required, to insure proper disposition of said two pieces in respective conveyor pockets.

11. The construction of claim 10 wherein said means for varying relative movement momentarily accelerates movement of said conveyor means for the purpose aforesaid.

12. The construction of claim 10 wherein said conveyor means comprise a plurality of rotating shafts in side-by-side relation, wherein said shafts have a spiral fin thereon and rotatable therewith, and wherein adjacent fin portions provide a space therebetween extending longitudinally of its shaft to provide the piece-receiving conveyor pocket aforesaid.

13. Apparatus for handling elongated pieces of pipe and the like, comprising means providing a pair of paths in spaced, side-by-side relation and successive pieces moving longitudinally along alternate paths aforesaid, a skid trough in side-by-side relation with said pair of paths and along which a piece travels longitudinally under frictional retardation for eventual stoppage, kickout means for transversely shifting a piece from one of said paths to said skid trough, means adjacent said skid trough providing a transverse path along which said pieces are transversely movable, transfer means for simultaneously transfering a piece from said skid trough and a piece from the other of said pair of paths to said transverse path, said transfer means providing a second skid trough along which a piece from said other path of the pair of paths aforesaid travels longitudinally under frictional retardation for eventual stoppage, means responsive of the position of a piece in said one path for initiating operation of said kickout means after a time delay and responsive to the position of a piece in said other path for initiating operation of said transfer means after a time delay, and means for varying the time delays aforesaid to adjust the stopping position of said pieces in the desired relationship with the means providing the transverse path aforesaid.

14. Apparatus for handling elongated pieces of pipe and the like, comprising means providing a pair of paths in spaced, side-by-side relation and successive pieces moving longitudinally along alternate paths aforesaid, a first skid trough in side-by-side relation with said pair of paths and along which a piece travels longitudinally under frictional retardation, means for transversely shifting a piece from one of said paths to said first skid trough, means adjacent said first skid trough providing a transverse path along which said pieces are transversely movable, means providing a pair of upwardly facing channels in side-by-side relation and one channel being positioned beneath the other of said pair of paths for non-interference with a piece moving therealong and the other of said channels normally being positioned beneath said first skid trough for non-interference with a piece moving therealong, said one channel constituting a second skid trough along which a piece travels under frictional retardation, and means for first elevating said pair of channels to transfer a piece from said first skid trough to said other channel and to transfer a piece from said other path to said one channel and for thereafter simultaneously shifting said pair of channels transversely to transfer respective pieces together to said transverse path.

15. Apparatus for handling elongated pieces of pipe and the like, comprising means providing a first path for transporting said pieces longitudinally in close succession at a relatively high speed, means providing a pair of second paths for transporting said pieces longitudinally at a relatively low speed, said second paths being in side-by-side relation and disposed on opposite sides of and transversely spaced from said first path and said second paths being coextensive with said first path a distance at least equal to the length of said sections, means at the coextensive path portions for shifting successive pieces from said first path to alternate second paths, a skid trough to one side of said pair of paths and along which a piece travels longitudinally under frictional retardation for eventual stoppage, said skid trough being coextensive with said one path a distance at least equal to the length of said sections, kickout means at the coextensive portion of said skid trough for transversely shifting a piece from said one path to said skid trough, means adjacent said skid trough providing a transverse path along which said pieces are transversely movable, and transfer means for simultaneously transferring a piece from said skid trough and a piece from the other of said pair of paths to said transverse path, said transfer means providing a second skid trough along which a piece from said other path of the pair of paths aforesaid travels longitudinally under frictional retardation for eventual stoppage adjacent the piece transferred from said first skid trough.

16. Apparatus for handling elongated pieces of pipe and the like, comprising a plurality of elongated rolls in side-by-side relation forming a conveyor and the intermediate portions of said rolls providing a first conveyor path and the end portions of said rolls providing respective second conveyor paths each for longitudinally transporting said pieces, means for rotating the intermediate portion of each roll and its end portions at the same rotational speeds, the intermediate portions of said rolls being of relatively large diameter wherein they have a relatively high peripheral speed for transporting said pieces in said first path in close succession at relatively high speed and the end portions of said rolls being of relatively small diameter wherein they have a relatively low peripheral speed for transporting said pieces at relatively low speed, means for shifting successive pieces from said first path to alternate second paths, a skid trough to one side of one path of said pair of paths and along which a piece travels longitudinally under frictional retardation for eventual stoppage, kickout means for transversely shifting a piece from said one path to said skid trough, means adjacent said skid trough providing a transverse path along which said pieces are transversely movable, and transfer means for simultaneously transfering a piece from said skid trough and a piece from the other of said pair of paths to said transverse path, said transfer means providing a second skid trough along which a piece from said other path of the pair of paths aforesaid travels longitudinally under frictional retardation for eventual stoppage adjacent the piece transferred from said first skid trough.

17. The construction of claim 16 wherein the peripheral speed of said end roll portions is approximately one half that of said intermediate roll portions to provide for longitudinal transport of said pieces in said second paths at a speed approximately one half of the speed of transport of said pieces in said first path, wherein said means for shifting said pieces from said first path to alternate second paths comprises a plurality of fingers spaced longitudinally of said first path and such fingers being interposed between respective adjoining rolls aforesaid, wherein said fingers are shiftable from one side of said first path to the other side thereof to shift a piece from said first path to one of said second paths, and wherein said fingers are shiftable from said other side of said first path to said one side thereof to shift the next successive piece from said first path to the other of said second paths.

18. The construction of claim 17 and further comprising means responsive to the position of a piece in said one of said second paths for initiating operation of said kickout means after a time delay and responsive to the position of a piece in said other of said second paths for initiating operation of said transfer means after a time delay, and means for adjusting the time delays aforesaid to adjust the stopping position of said pieces in the desired relationship with the means providing the transverse path aforesaid.

References Cited
UNITED STATES PATENTS

| | | | |
|---|---|---|---|
| 1,315,670 | 9/1919 | Keller | 198—107 |
| 1,352,766 | 9/1920 | Sheperdson | 198—127 |
| 1,831,508 | 11/1931 | Quinn | 198—127 X |
| 1,906,249 | 5/1933 | Crowley. | |
| 2,765,896 | 10/1956 | Peterson | 198—24 |
| 3,033,025 | 5/1962 | McConnell | 214—1 X |
| 3,045,805 | 7/1962 | Shappell | 198—76 |
| 3,052,338 | 9/1962 | Kirchner et al. | 198—24 |
| 3,075,630 | 1/1963 | Fisk | 198—76 |
| 3,206,002 | 9/1965 | Hartenstein et al. | 198—25 X |

EVON C. BLUNK, *Primary Examiner.*

R. J. HICKEY, *Assistant Examiner.*

UNITED STATES PATENT OFFICE
CERTIFICATE OF CORRECTION

Patent No. 3,342,302                        September 19, 1967

Harry C. Ledebur

It is hereby certified that error appears in the above numbered patent requiring correction and that the said Letters Patent should read as corrected below.

Column 9, line 51, for "R-3" read -- R-4 --; column 12, line 10, for "of the" read -- to the --; line 30, after "one channel" insert -- normally --.

Signed and sealed this 1st day of October 1968.

(SEAL)
Attest:

Edward M. Fletcher, Jr.                      EDWARD J. BRENNER
Attesting Officer                            Commissioner of Patents